United States Patent

Behm et al.

Patent Number: 5,150,457
Date of Patent: Sep. 22, 1992

[54] ENHANCED VISUALIZATION USING TRANSLUCENT CONTOUR SURFACES

[75] Inventors: Jason L. Behm, Kingston; Wei-Hwan Chiang, Hurley, both of N.Y.

[73] Assignee: International Business Machines Corporation, Armonk, N.Y.

[21] Appl. No.: 517,785

[22] Filed: May 2, 1990

[51] Int. Cl.$^5$ ............................................. G06F 15/72
[52] U.S. Cl. .................................. 395/120; 395/126; 395/140
[58] Field of Search ............... 395/119, 120, 126, 131, 395/133, 140, 141, 152, 161; 340/729

[56] References Cited

U.S. PATENT DOCUMENTS 4,996,654  2/1991  Rosenow .............................. 395/140

OTHER PUBLICATIONS

Grinstein et al., EXVIS: An Exploratory Visualization Environment, Graphics Interface '89, pp. 254-261.
Kleiner et al., Representing Points in Many Dimensions by Trees and Castles, Journal of the Am. Stat. Assoc., Jun. 1981, vol. 76, No. 374, pp. 260-276.
Chernoff, The Use of Faces to Represent Points in K-Dimensional Space Graphically, Journal of the Am. Stat. Assoc., Jun. 1973, vol. 68, No. 342, pp. 361-368.

*Primary Examiner*—Gary V. Harkcom
*Assistant Examiner*—Mark K. Zimmerman
*Attorney, Agent, or Firm*—Mark S. Walker

[57] ABSTRACT

Numerical data values are analyzed, organized, and stored for retrieval and rendering on a graphics display system. Numerical data arrays are organized for rapid access and display using graphical transforms. Scientific data is transformed into concurrently displayed translucent three dimensional contour surfaces allowing analysis of multi-dimensional data. Display management functions are provided for viewing transformed data in three dimensional form, as cut by specified plane or as viewed over time by using short time delays between related displays to provide a movie-like presentation. Input data may be accepted from an operator by the visualization manager for redirecting or steering an underlying numerical simulation.

8 Claims, 2 Drawing Sheets

ENHANCED VISUALIZATION USING TRANSLUCENT CONTOUR SURFACES

BACKGROUND OF THE INVENTION

1. Field of the Invention

This invention is directed to computer methods and apparatus for displaying numerical data, and more particularly to methods and apparatus for generating visual images from numerical data created by numerical simulations or collected from a measured environment.

2. Background of the Invention

Computer technology is being employed to analyze an increasing variety of scientific, engineering and business problems. Computer applications have been developed that numerically simulate a problem providing data on the response of a particular environment to certain stimuli or conditions. In addition, computer technology has made possible numerical analysis of data collected from certain measured environments. These environments include, for example, medical imaging technologies such as computer axial tomography (CAT) and nuclear magnetic resonance (NMR). Astronomy / astrophysics researchers use radio telescopes to collect large amounts of data for computer processing. The processing may include displaying multidimensional data in graphical or visual form.

The use of numerical models and numerical data collection techniques has been hampered by the problem of adequately presenting the results of the simulation or data collection to the researcher in an effective form for human understanding. Early simulations provided large printouts containing long columns of numbers. More recently, the results of simulations or numerical analyses have been commonly shown using graphical representations. The latest computer technology employs high resolution graphics workstations or specialized graphics terminals to display the simulated or measured data in a variety of readily understood forms.

Current advanced graphic display systems have the disadvantage of requiring sophisticated knowledge of graphics programming techniques to transform the results of a computer simulation or measurement into usable graphics output. Prior art systems also suffer from the limitation being oriented to the display of data in two dimensional formats similar to earlier printed plots. Without sophisticated graphics programming capabilities the researcher is unable to use the more advanced features of a graphics display system to glean the full value of the data.

SUMMARY OF THE INVENTION

The present invention is directed towards providing an easy way for researchers to display and manipulate data resulting from numerical simulations or data collected from a measured environment. It is an object of the present invention to provide an easy to use visualization method with multiple forms of display of numerical data for computer researchers. The types of displays provided include single still images, a movie-like sequence of related images, and images comprised of translucent contoured surfaces. The three dimensional representational system according to the present invention provides the ability to view a resultant image from any angle, to manipulate the image, and to re-view data previously considered.

It is yet another object of the invention to provide an image management system that accepts multi-dimensional data arrays and is capable of organizing and storing the arrays in a form for later retrieval and display.

It is yet another object of the invention to provide a system that allows real time results display and "steering" of a simulation being performed by a computer application.

The solution to these and other objects of the invention will become more clear in the detailed description of the preferred embodiment.

DESCRIPTION OF THE PREFERRED EMBODIMENT

Figure 1:
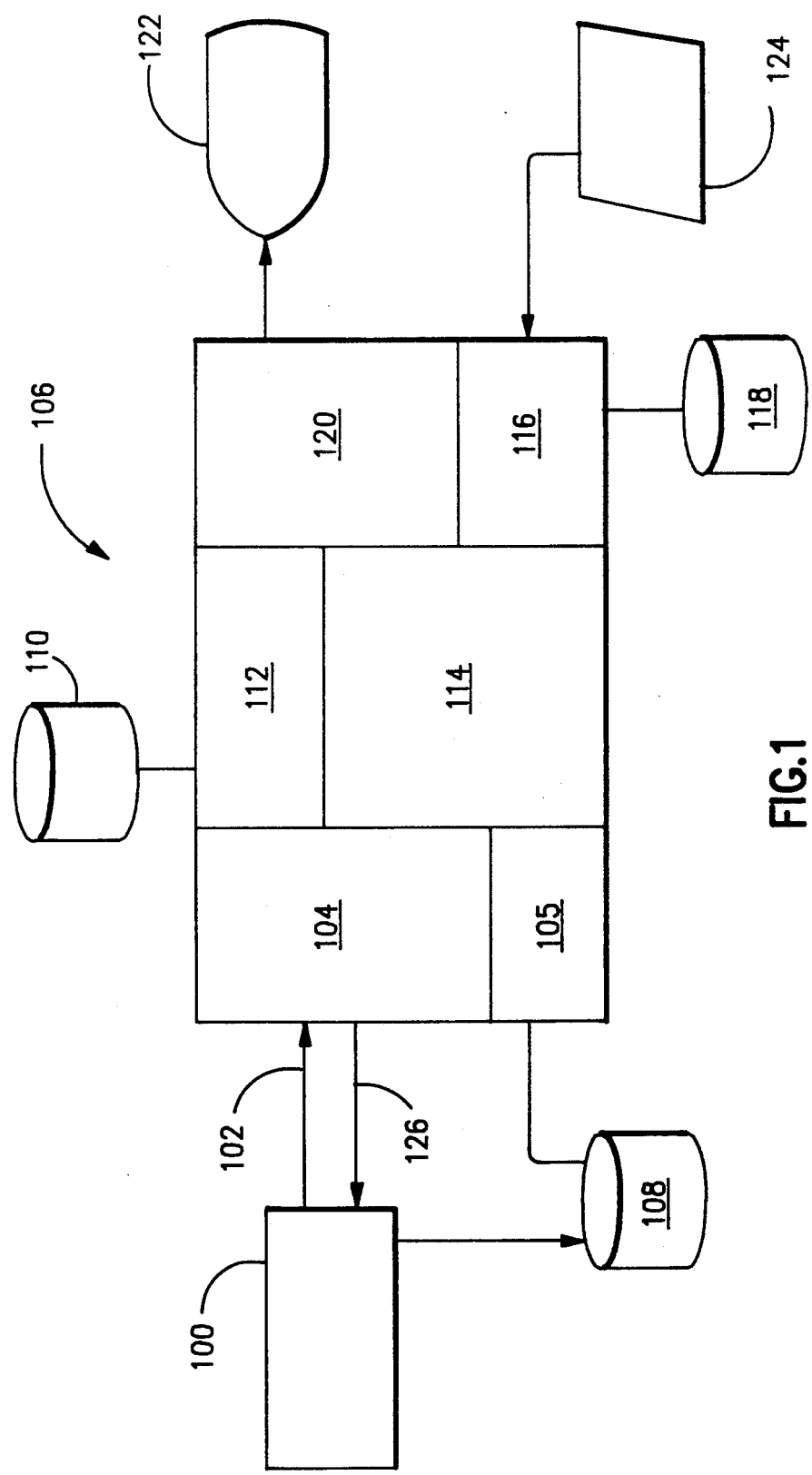
FIG. 1 is a block diagram of a visualization system according to the present invention.

The present invention is directed to providing a system and methodology for managing numerical data generated by a numerical simulation or collected by data gathering apparatus. The system of the preferred embodiment will be described with reference to FIG. 1. A computer application 100 performing a numerical simulation or data gathering function produces numerical results in the form of an array of numerical values. These values are typically arranged in the form of an array of discretely sampled points. The data collected is multi-dimensional, i.e. it can contain an unlimited number of observations, i. The discrete data array is typically presented as follows:

$x(i), y(i), z(i), t(i), v1(i), v2(i), \ldots, vn(i)$.

A computer application 100, according to the present invention, periodically transmits a data array or mesh 102 containing data values as described above to program interface 104 of the present system. Interface 104 accepts the data 102 and performs initial processing for visualization manager 106 according to control parameters 108 supplied by the application 100. The control parameters specify, among other things, the dimensions of the data array being passed to the interface, the length of each data item, and the status of any simulation that is occurring.

The preferred embodiment retains the data array 102 in storage 105 for reprocessing as the selected visualization method is changed. The control parameters are established by the researcher when the application 100 is developed and are stored at 108 when the application begins execution.

Interface 104 establishes the viewing method for the data using control parameters 108. Mesh data passed in array 102 is typically viewed in one of the following ways: pixelization; volume rendering; translucent contour surfaces; and three dimensional arrows representing vector data.

Pixelization is the most common visualization technique. A two dimensional view is generated from the x(i), y(i) and z(i) values for various time steps t(i), and for various variables considered, vj(i). Images may be created from the data by setting all but two of the dimensions constant and mapping the remaining two dimensions to the two physical dimensions of the workstation display surface. Thus, for any time and variable (e.g. pressure, temperature, velocity,) and constant depth z, the x and y dimension may be mapped to the workstation's horizontal and vertical dimensions.

Color can be used to indicate the value of each location (pixel) on the display surface e.g. blue for low temperature and red for high temperature. The colors may be discrete or smoothly interpolated between known values.

The system according to the present invention treats all dimensions with equal status. In other words, the researcher may view all combinations of variables even those which initially do not appear to make sense. For example, the researcher may choose to hold x,y, and z constant and view time and the variables as the two dimensions. In this case, all data displayed is for a single point in the mesh but the display contains the data associated with all times and all variables for that point. Each horizontal row will represent times for a particular variable and each vertical column represent all variables for a particular time. The usefulness of such a combination may not be anticipated, however the ability should exist to display that combination. This capability can give a researcher new understanding and insight into the data being analyzed.

A second form of data display is volume rendering. Volume rendering is typically used in medical imaging such as the images produced by computer axial tomography (CAT) scans. The data value mesh may be shown by creating a solid for each cube in the mesh (a voxel) and then rendering that cube on a workstation. Removing individual cubes, or making them transparent or translucent creates greater flexibility in attempting to analyze the results of the computation or measuring.

Translucent contour surfaces may be used to view multiple contour surfaces simultaneously. The three-dimensional data values may be represented by using a workstation's three-dimensional processing capability to generate a contour surface. The contour surface is generated using triangulation or non-rational uniform B-spline (NURBS) processing to create a surface encompassing a constant value for one data variable (an isometric surface) e.g. the isothermal surface representing all points where the temperature is 100 degrees.

The present invention includes an ability to generate translucent colored contour surfaces. Each surface may have a specified color and degree of translucency, i.e. the relationship between the visible and non visible portions of any surface area.

Translucency allows multiple surfaces to be shown on the display system with the ability to view the particular contours of each. The displayed contour surface when combined with display device features for three-dimensional rotation, translation, and zoom, and with an ability to provide movie-like views a (timed sequence of a series of surfaces), greatly enhances the researcher's ability to perceive the complex interactions occurring within data from a computer simulation or measured environment.

A contour surface is produced 130 by interpolating along the axis of the mesh to find where the surface crosses each of the mesh lines (each mesh line represents a constant value). The operator establishes the contour mesh line values to be viewed. These values are retained in interface 104.

To display more than one contour surface concurrently, an image may be rendered which shows all of the contour surfaces even though one contour surface may be completely contained within another contour surface and normally hidden using prior visualization methods. Each of the surfaces is rendered using a translucent color capability which allows each surface to be visible even though contained within another surface. When combined with the ability to rotate the surfaces in three-dimensions, the researcher is provided with a good vehicle for perceiving and analyzing the result of a calculation or measurement.

Translucent contour surfaces and pixelization may be combined in a single view. For example, the researcher would be able to specify any two dimensional cutting plane originated in three-dimensions and have pixelization interpolated onto that plane. This appears as a pixelized plane cutting through the transparent or translucent surfaces and rendering them in perspective in three-dimensions. The researcher is also able to move the plane independently from the contour surfaces and thus sweep across the contour surfaces with continuous pixelization taking place.

Three-dimensional arrows may also be added to the rendered image to show the values of particular variable. For example, arrows could be provided showing for the indicated point the velocity of movement of a fluid across the surface. Each arrow represents a vector at that point. The preferred embodiment uses cone arrows having different colored interior and exterior surfaces allowing the researcher to see the difference between arrow tails oriented toward or away from the view point.

The data structure is organized hierarchically using the Programmers Hierarchical Interactive Graphics Standard (PHIGS) representation. Each contour surface is defined as an atomic object that can be related 132 to form aggregated images. The display image is the highest level combination of all aggregated images selected for viewing. The preferred embodiment uses the IBM graPHIGS program product to organize and store the data.

The use of hierarchically structured objects provides the researcher with significant flexibility to manipulate the displayed images. For example, the original image may include surfaces generated at ten contour levels. A simplified image showing contours at only five levels can be generated by simple operator commands 136. The basic data 102 is not reanalyzed so the new display is quickly generated.

The researcher may also use workstation features for manipulating objects by rotation, scaling, and translation. Operator interaction devices 124 may include a mouse, dials, cursor and tablet or other means of manipulating the image. These devices are managed by I/0 manager 116 because the data is represented in standard form, the researcher can use these manipulation features without detailed programming and without reanalyzing the data. Finally, the researcher may change the object properties by varying the color, lighting source and intensity, or degree of translucency.

Modification 138 of the dimensions held constant and displayed or changes to contour levels requires that interface 104 reprocess the data values retained in memory 105 to generate new contour surface objects for display.

A profile 110 is provided to image manager 112 for organizing and storing the data values accepted through interface 104. Data values are structured by structure organization 114 and stored by input/output (I/O) manager 116 onto disk or other storage 118. The use of default parameters in the structure organization means 114 and the use of graPHIGS objects allows I/O manager 116 to have standardized storage formats that are capable of accepting a variety of data for storage in a common format.

Data structure organizer 114 converts the data array 102 into a standardized storage format according to PHIGS conventions. Hierarchical storage allows rapid retrieval and manipulation of the data to be displayed in a variety of formats. Display manager 120 is used to extract the appropriate data, perform rendering functions and transmit the data for display on display device 122. While in the preferred embodiment a video display device is used, it will be understood that any form of all-points-addressable display device may be used with the present invention.

The display manager 120 manages the display so that multiple windows can be displayed on monitor 122 with the data in each window being extracted independently. This allows the same data to be viewed from a variety of angles or with a variety of variables in concurrent windowed displays.

The display of data from a computer simulation in three-dimensional form provides greater information to the researcher than static graphic plots. By viewing data results while the simulation is proceeding the researcher has an opportunity to guide or terminate the simulation based upon a graphical review of the output. This review or termination is known as "steering" the simulation. The "steering" may involve modifications to selected variables of the simulation or outright termination. Input devices 124 are used to communicate steering modifications to visualization manager 106. These controls are passed over line 126 to applications program 100 for action. The preferred embodiment establishes communication between application 100 and visualization manager 106 through a common block.

Figure 2:
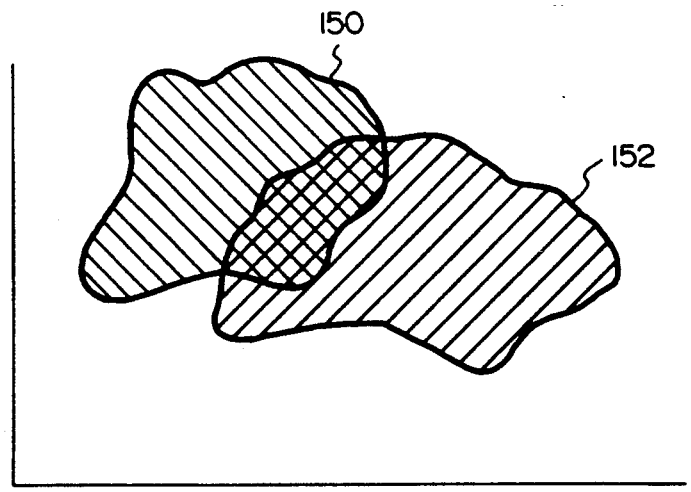
FIG. 2 is an example of translucent contoured surfaces.
Figure 3:
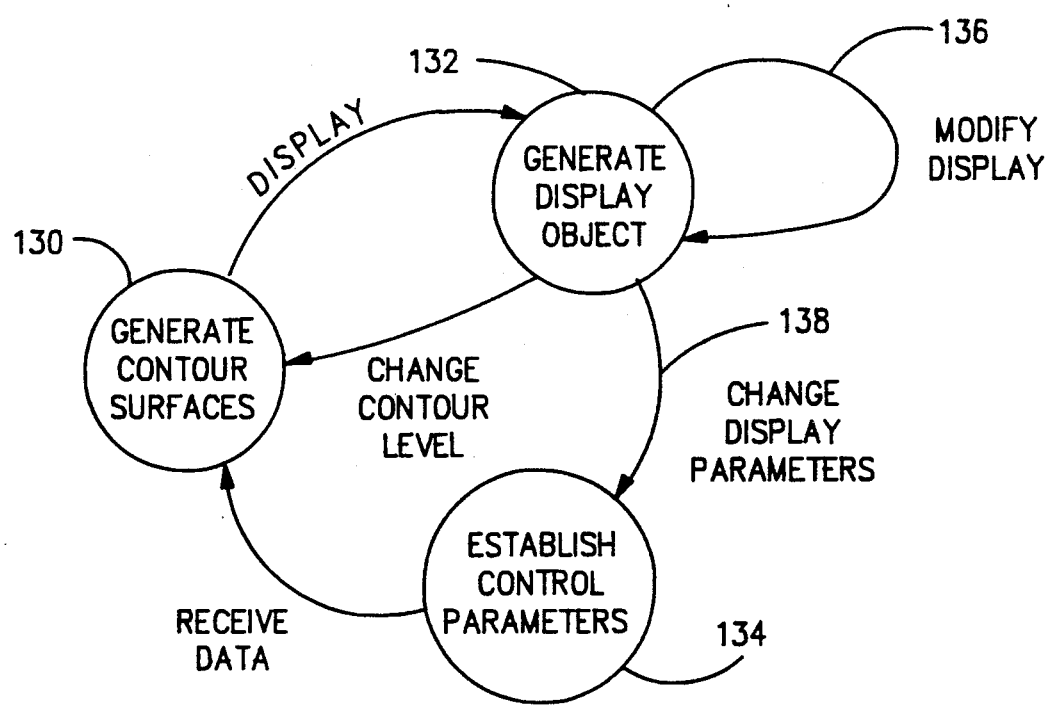
FIG. 3 is a state transition diagram illustrating the operation of the preferred embodiment of the present invention.

The ability to view multiple three-dimensional contour surfaces and the ability to use graphics workstation tools to analyze the contour is a great benefit to researchers. FIG. 2 illustrates the concept of multiple translucent surfaces on a single display. Surfaces 150 and 152 each represents a separate contour surface in an experiment under study. Prior art systems were unable to provide an effective means of visualizing an overlap between 150 and 152. The prior art systems would cause the 150 or 152 to overlay the other thus obscuring a portion of the resulting display. Present invention cures this problem by using translucency so that portions of both the first and the second, and subsequent images may be viewed by the researcher. It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A method for generating a visual representation of discretely sampled data values on a display device, said data values each representing a value of a variable describing a property of a real or imaginary system, said method operating on a computer system having a storage means and an operator interaction means, the method comprising the steps of:

storing a data transform and a set of image organization rules;

transforming said discretely sampled data values into a standardized data structure according to said data transform;

storing said standardized data structure in a hierarchical data structure store according to said image organization rules;

accessing said heirarchical data structure to extract a plurality of standardized data structures for visual representation;

rendering said plurality of standardized data structures as a two dimensional representation of a three dimensional figure to create said visual representation;

storing said visual representation in said storage means for display on said display device.

2. The method of claim 1 wherein said transforming step generates data objects representing isometric contour surfaces.

3. The method of claim 2 further comprising the step of:

repeating the steps of accessing, rendering, and storing the visual representation for each of a plurality of viewing windows based on parameters entered through said operator interaction means.

4. The method of claim 2, wherein said rendering step is controlled by said operator interaction means, and wherein said rendering can include translation, scaling or rotation of said visual representation.

5. The method of claim 1 further comprising the steps of:

storing said discretely sampled data values in said storage means; and repeating the transforming step through the storing said visual representation step whenever said operator interaction means indicate a change to said data transform.

6. The method of claim 1 wherein said standardized data structure conforms to the Programmer's Hierarchical Interactive Graphics Standard (PHIGS).

7. A system for visualizing numerical data wherein said data is continuously generated, said system comprising:

storage means for periodically storing a set of said numerical data;

object generation means for transforming said set of numerical data into three dimensional translucent contour surfaces, rendering means for rendering said translucent contour surfaces allowing concurrent viewing of all such surfaces; and display means for displaying said rendered contour surfaces.

8. The system of claim 7 wherein said contour surfaces are generated as non-rational uniform b-spline functions of said set of numerical data.

* * * * *